US006840540B2

(12) United States Patent
Fügel

(10) Patent No.: US 6,840,540 B2
(45) Date of Patent: Jan. 11, 2005

(54) SUPPORT STRUTS FOR MOBILE WORKING MACHINES AND MOBILE CONCRETE PUMP WITH SAID SUPPORT STRUTS

(75) Inventor: Dietmar Fügel, Wolfschlugen (DE)

(73) Assignee: Putzmeister Aktiengesellschaft (DE)

( * ) Notice: Subject to any disclaimer, the term of this patent is extended or adjusted under 35 U.S.C. 154(b) by 144 days.

(21) Appl. No.: 10/239,495

(22) PCT Filed: May 26, 2001

(86) PCT No.: PCT/EP01/06032

§ 371 (c)(1),
(2), (4) Date: Sep. 20, 2002

(87) PCT Pub. No.: WO02/08522

PCT Pub. Date: Jan. 31, 2002

(65) Prior Publication Data

US 2003/0038466 A1 Feb. 27, 2003

(30) Foreign Application Priority Data

Jul. 7, 2000 (DE) ........................................ 100 32 622

(51) Int. Cl.[7] .................................................. B60S 9/12
(52) U.S. Cl. ................................ 280/763.1; 280/766.1
(58) Field of Search .......................... 280/763.1, 764.1, 280/765.1, 766.1; 212/301, 302, 303, 304, 305

(56) References Cited

U.S. PATENT DOCUMENTS

| | | | | |
|---|---|---|---|---|
| 2,375,264 A | * | 5/1945 | Wagner et al. | 212/303 |
| 3,362,544 A | * | 1/1968 | Wellnitz | 212/175 |
| 3,854,595 A | | 12/1974 | Kuhn | |
| 3,953,052 A | * | 4/1976 | Palmcrantz | 280/763.1 |
| 4,084,777 A | * | 4/1978 | Lambert | 248/287.1 |
| 4,118,054 A | * | 10/1978 | Vigerie | 280/765.1 |
| 4,418,713 A | * | 12/1983 | Schlecht | 137/351 |

(List continued on next page.)

FOREIGN PATENT DOCUMENTS

| | | | |
|---|---|---|---|
| DE | 1 481 849 | 6/1969 | |
| DE | 1 481 863 | 7/1969 | |
| DE | 70 12 343 U1 | 7/1970 | |
| DE | 117 663 | 1/1976 | B66C/13/00 |
| DE | 27 10 303.3 | 9/1978 | B66C/23/78 |
| DE | 27 39 355.1 | 9/1978 | E04G/21/04 |
| DE | 34 26 611.9 A1 | 1/1986 | B66C/9/10 |
| DE | 42 03 820.0 | 8/1993 | E04G/21/04 |
| DE | 298 15 145 U1 | 10/1998 | B66C/23/80 |
| DE | 199 23 479.5 | 11/2000 | B60S/1/02 |
| EP | 0 786 431 A2 | 7/1997 | B66C/23/42 |
| FR | 1.465.606 | 1/1967 | |
| FR | 1.455.107 | 8/1967 | |
| WO | WO 99/67482 | 12/1999 | E04G/21/04 |

OTHER PUBLICATIONS

Fordern und heben 18, 1968, No. 5, p. 297; figure 8.

PPM mit neuen Fahrzeugkranen: Baureichen nach oben erweitert. In: foerdern und heben 35, 1985, No. 1, p. 51; figure 2.

*Primary Examiner*—Christopher P. Ellis
*Assistant Examiner*—Bridget Avery
(74) *Attorney, Agent, or Firm*—Pendorf & Cutliff

(57) ABSTRACT

A support strut for mobile working machines, especially for mobile concrete pumps. The support strut (20) has a strut body (38) that can be pivoted around a vertical pivoting axis (32) on a chassis (10), a telescopic part (40), a dual-acting hydraulic cylinder (42) (38) and the telescopic part (40), in addition to a foot part (26) that. Both ends of the telescopic hydraulic cylinder (42) are fixed on fixing points (46, 50) in the area of the opposite ends of the body of the strut (39/8) and the telescopic part (40). The vertical pivoting axis (32) is defined by a divided bearing or journal location arranged at an axial distance (S) from the inboard fixing point (46) in the direction of the foot part on the body of the boom (38), said location being positioned in such a way that it transects the displacement axis (52) of the hydraulic cylinder (42) transversely.

20 Claims, 6 Drawing Sheets

U.S. PATENT DOCUMENTS 4,607,862 A * 8/1986 Deram et al. ............ 280/765.1
4,619,369 A * 10/1986 Mertens ...................... 212/304
4,624,357 A * 11/1986 Oury et al. ................. 198/313
5,640,850 A * 6/1997 Benckert et al. .............. 60/422
5,961,145 A * 10/1999 Schillinger et al. ...... 280/764.1
6,092,975 A * 7/2000 Cannon, Jr. et al. ........ 414/563
6,138,845 A * 10/2000 Kaspar ....................... 212/302
6,276,718 B1 * 8/2001 Wolfram et al. ......... 280/765.1
6,308,985 B1 * 10/2001 Wolfram .................. 280/766.1
6,390,504 B1 * 5/2002 Fetzer ..................... 280/763.1
6,484,752 B1 * 11/2002 Ebinger et al. ............. 137/615
6,516,917 B1 * 2/2003 Mayer et al. ................. 182/17

* cited by examiner

SUPPORT STRUTS FOR MOBILE WORKING MACHINES AND MOBILE CONCRETE PUMP WITH SAID SUPPORT STRUTS

CROSS REFERENCE TO RELATED APPLICATION

This application is a national stage of PCT/EP01/06032 filed May 26, 2001 and based upon DE 100 32 622.6 filed Jul. 7, 2000 under the International Convention.

BACKGROUND OF THE INVENTION

1. Field of the Invention

Description

The invention concerns an outrigger or support strut for mobile working machines, in particular for mobile concrete pumps, with a strut body that can be rotated about a vertical pivot axis on the vehicle chassis, with a telescopic part that can be retracted into the strut body and with a vertically displaceable foot part provided on the outboard end of the telescopic part. The invention further concerns a mobile concrete pump support strut of this type.

2. Description of the Related Art

With mobile concrete pumps it is known to provide telescopic support struts which are pivotable sideways out from the vehicle chassis for stabilizing the concrete pump in the work position (DE-C-4203820), of which the vertical pivot axis is located at the inboard end of the strut body. When in the transport position the forward support struts are oriented to extend outwards from the pivot point towards the front, essentially parallel to the direction of travel, and when in the work position they extend diagonally forwards out over the vehicle chassis. The telescopic part provided displaceably in the pivotable strut body is therein in the form of a single piece. The forward support struts are mounted pivotably about a vertical axis at the inboard end of the strut body at vehicle fixed pivot mounts, wherein the pivot mounts are provided spaced apart from the rotation mechanism of the concrete distribution boom and in proximity to the storage position for the inboard support struts. By the relatively large distance between the support struts and the rotating mechanism there results a suboptimal force distribution from the concrete distribution boom to the support struts, which results in a non-stable support stance relationship.

SUMMARY OF THE INVENTION

Beginning therewith it is the task of the present invention to develop a support strut for mobile working machines, in particular for mobile concrete pumps, which exhibit a low space requirement both the transport position as well as when extended at the construction site and nevertheless provides a stable support.

For the solution of this task there is proposed the combination of characteristics set forth in patent claims 1 and 10. Advantageous embodiments and further developments of the invention can be seen from the dependent claims.

The inventive solution is based upon the concept, that by shifting the vertical pivot axis from the end of the strut body into the strut body itself a better space utilization during the pivoting process and a better support stability can be achieved. In order to accomplish this, it is proposed in accordance with the invention, that a double acting hydraulic cylinder extends through the strut body and the telescopic part, which at its respective ends is secured to bearing positions located in the area of the opposing ends of the strut body and the telescopic part, and that the vertical pivot axis is formed by a divided bearing point located axially distanced from the inboard hydraulic cylinder securing position in the direction of the foot part on the strut body and is so positioned that the displacement axis of the hydraulic cylinder transects this perpendicularly or diagonally. The bearing point, divided by one cut, is formed by two bearing eyes lying diametrically opposite to each other at the strut body, adapted for receiving a two-part bearing bolt. With this means it is achieved, that the bearing bolt does not extend through the strut body.

A preferred embodiment of the invention envisions that the distance of the vertical pivot axis from the inboard end of the strut body is at least one-fifth and at the most two-thirds of the strut body length. Preferably the distance of the pivot axis from the inboard end of the strut body is between one-fourth and one-third of the length of the strut body. Therein it is of advantage, when the telescopic part, which is retractable into the strut body, itself comprises two telescopic tubes retractable into each other. Accordingly, the hydraulic cylinder for telescopic displacement is in the form of a multi-telescopic cylinder.

For reducing friction forces occurring during the extension of the telescopic part out of the strut body, it is proposed in accordance with a preferred embodiment of the invention, that the strut body in the area of its output outboard end includes a support roller or bearing, upon which the telescopic part is supported during extension and retraction.

A further advantageous embodiment of the invention envisions, that the double acting, preferably telescopic hydraulic cylinder, when at its respective end positions, can be acted upon with hydraulic fluid from the inboard end of the strut body. For this purpose there is provided a supply or connection line extending in the axial direction through the cylinder.

Preferably the foot part provided at the outboard end of the telescopic part includes a hydraulic extension cylinder, which can be acted upon with hydraulic fluid from a hydraulic hose or line rolled on a hose drum.

It is envisioned in accordance with a preferred embodiment of the invention that the preferably telescopic hydraulic cylinder is secured or connected with its free rod side end at the strut body and with its free floor side end is connected at the innermost telescopic tube of the telescopic part.

The inventive mobile concrete pump includes a vehicle chassis with at least one forward axle and one rearward axle, a rotation mechanism for the concrete distribution boom provided on the chassis near the forward axle, a pump unit mounted behind the rotation means on the vehicle chassis and a support strut assembly provided on the vehicle chassis. The support assembly for its part includes two forward support struts and two rearward support struts pivotable about a pivot axis between a transport position and at least one support position. The forward support struts are therein mounted with their strut body in the area of the rotary mechanism, at respectively one chassis fixed bearing point, via divided or separate bearing bolts, wherein the strut bodies at their respective two ends extend out, transverse to the pivot axis, beyond the bearing point. A preferred embodiment of the invention envisions that the forward support strut with its strut body is oriented parallel to the vehicle chassis longitudinal axis when retracted in the transport position, and when extended in the working position the telescopic parts extend with their foot part diagonally forwards beyond the vehicle chassis edge. Preferably, the forward support struts are oriented with their foot parts facing forwards in the direction of travel in the transport position. In this case the space requirement during the extension process is particularly small. Basically it is however also possible, that the forward support struts are oriented with their foot parts facing rearwards relative to the direction of travel when in the transport position. This is particularly possible, in the case of relatively small space requirement, when the telescopic part is a multi-segmented telescopic part and, accordingly, a relatively short strut body is provided. The vertical pivot mount of the support strut can thereby be located close to the rotary mechanism, so that a kinesthetically desirable flow or transmission of force from the concrete distribution mast through the rotary mechanism to the support struts results.

It is basically possible, to construct the rearward support struts as telescopic struts in the already described manner and to mount them with their strut body in the vicinity of the rotary mechanism via separated or divided bearing bolts at respectively one vehicle chassis fixed bearing point, wherein the strut bodies at their two ends extend, transversely to the pivot axis, beyond the bearing point. These rearward support struts also could be oriented with their strut bodies parallel relative to the vehicle longitudinal axis in the transport position when the telescopic parts are retracted, and in the operating position extending beyond the vehicle chassis edge with extended telescopic parts, with their feet parts deployed vertically downwards. The rearward support struts while in the transport position preferably face with their foot parts towards the rear relative to the direction of travel. This orientation has a low space requirement during deployment into the operating position. It is basically however also possible, to orient the rearward support struts in the transport position with their foot parts facing forwards relative to the direction of travel.

An improvement of the support strut stance stability can be achieved when the displacement axis of the hydraulic cylinder, relative to pivot axis of the forward and/or rearwards support struts, defines a diagonal or slant angle decreasing from the bearing point towards the foot part.

BRIEF DESCRIPTION OF THE DRAWINGS

In the following the invention will be described in greater detail by means of an embodiment represented in schematic manner in the figures. There is shown FIGS. 1*a* and *b* a partial sectional side view of a support strut for a mobile concrete pump in extended and retracted position.

DETAILED DESCRIPTION OF THE INVENTION

Figure 1A:
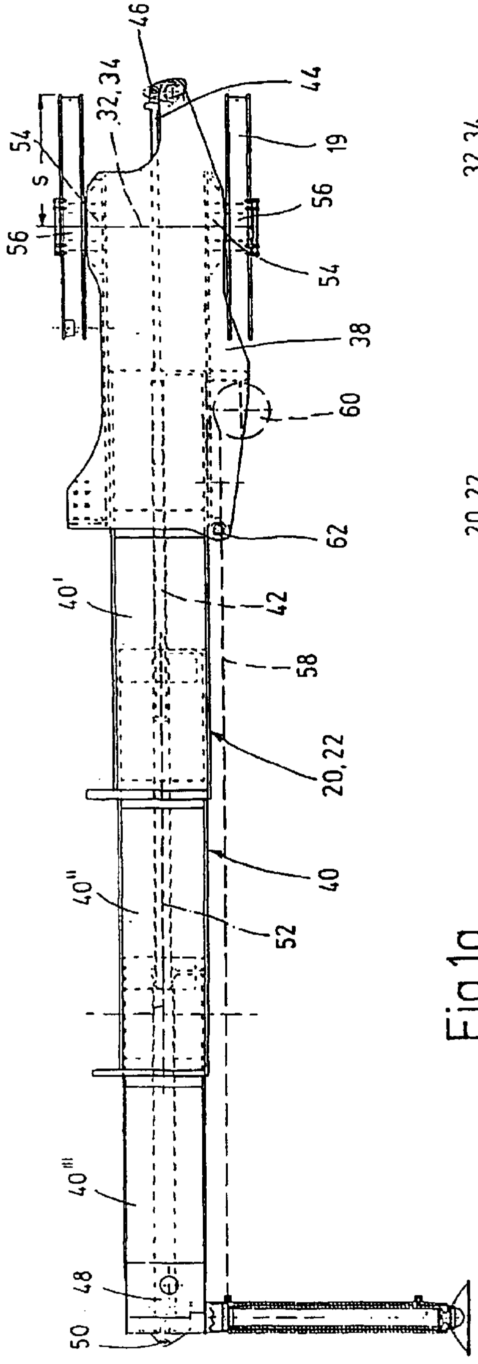

The mobile concrete pumps shown in the figures are comprised essentially of multi-axle vehicle chassis 10 with two forward axles 11 and three rear axles 12, with a driver cabin 13, a concrete distribution boom 15 mounted rotatably about a vertical axis on a rotation mechanism 14 near the forward axle, with a pump unit 16 mounted on the vehicle chassis 10 spaced apart from the rotation mechanism 14 as well as a support assembly 18 for the vehicle chassis 10. The support assembly 18 includes a vehicle chassis fixed carrier frame 19 and includes two forward support struts 20 and two rearward support struts 22, 22', which in the transport position are retracted and oriented parallel to the vehicle chassis longitudinal axis 24 and in the operating position extend diagonally forwards or, as the case may be, rearwards out beyond the vehicle chassis 10 and are supported upon the ground 30 with their foot parts 26, 28.

The forward support struts 20 are pivotable about their vertical pivot axis 32 and the rearward support struts 22, 22' are pivotable about their vertical pivot axis 34 between the transport position and the support position under the influence of respectively one deployment cylinder 36. It is essentially possible with the alternative embodiments that the adjacent forward and rearward support struts can be pivoted via a common actuator. Further, in all illustrative embodiments the forward support struts 20 and in some of the illustrative embodiments also the rearward support struts 22 are telescopic.

Figure 1B:
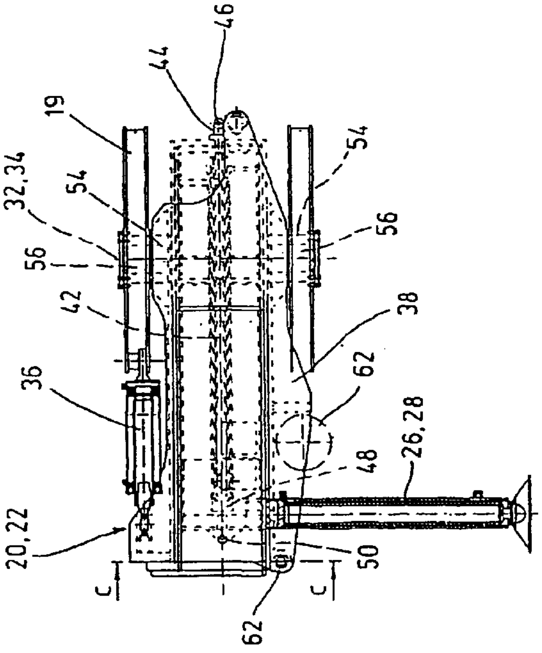

As can be seen particularly from FIGS. 1*a* and *b,* there is provided respectively one strut body 38 pivotable about the vertical pivot axis 32 or as the case may be 34 relative to the vehicle chassis and a telescopic part 40 comprised of three telescoping tubes 40', 40", 40'". A multi-telescopic double acting hydraulic cylinder 42 extends through the strut body 38, and the telescopic part 40 and is connected at its rod end 44 to a securing point 46 on the strut body, and is connected at its outboard-most base end 48 to a connecting point 50 on the telescopic tube 40'". Therein the securing point 46 is at the inboard end of the strut body 38, while the securing point 50 is at the outboard end of the telescopic tube 40'", so that the hydraulic cylinder 42 both in the extended position according to FIG. 1*a* as well as in the retracted end-position according to FIG. 1*b* is located completely within the support strut 20.

A peculiarity of the telescopic support strut 20 is comprised therein, that its vertical pivot axis 32 is formed by a bearing point 54 at the strut body 38 spaced axially a distance S from the inboard end cylinder securing point 46 in the direction towards the foot part 26, divided or separated, and so positioned, that it transects perpendicularly the displacement axis 52 of the hydraulic cylinder 42. The separated divided bearing point 54 is therein formed by two journals located diametrically opposite to each other on the strut body 38, and adapted for receiving a two-part bearing bolt 56. Therewith it is achieved, that the bearing bolts 56 do not extend through the strut body 38. In the illustrated embodiments the distance from the pivot axis 32 to the cylinder securing point 46 is approximately one-third of the length of the strut body 38. Since the pivot axis 32 of the telescopic strut body 20 is located in the vicinity of the side edge of the vehicle chassis 10, it is accomplished by this described means, that the inboard part of the strut body 38 during pivoting out of the support strut is pivoted inwardly in the area of the vehicle chassis 10, so that the space requirement during the deployment process is relatively small. As can be seen from FIGS. 2*b*, 3*b*, 4*b* and 5*b*, depending upon the deployment angle of the support strut, there is selected besides the normal or wide supporting (below) also a small or narrow support stance (above). Therewith an adaptation to the available space in the vicinity of the construction area is made possible. For deployment, the telescopic support struts 20 are first pivoted outwardly about the vertical pivot axis 32 and then telescoped out via the hydraulic cylinder 42. In order to reduce the frictional forces occurring during the deployment and retraction of the telescopic part 40, support rollers 62 are provided at the outboard end of the strut body 38, upon which the outer telescopic tube 40' of the telescopic part 40 rolls. The deployment of the foot part 26 likewise occurs hydraulically. The hydraulic supply necessary therefore occurs via the hydraulic line 58, which can be rolled upon a hose drum 60. The retraction of the telescopic support strut 20 occurs in the reverse sequence, wherein first the foot part 26 is lifted from the floor and as the case may be lifted upwards to the transport position shown in FIGS. 6*a* through *c*, then the telescopic tubes 40', 40", 40'" are retracted via the hydraulic cylinder 42 into the strut body 38 and finally the strut body 38 is pivoted in about the vertical pivot axis 32 with the aid of the deployment cylinder 36.

Figure 2A:
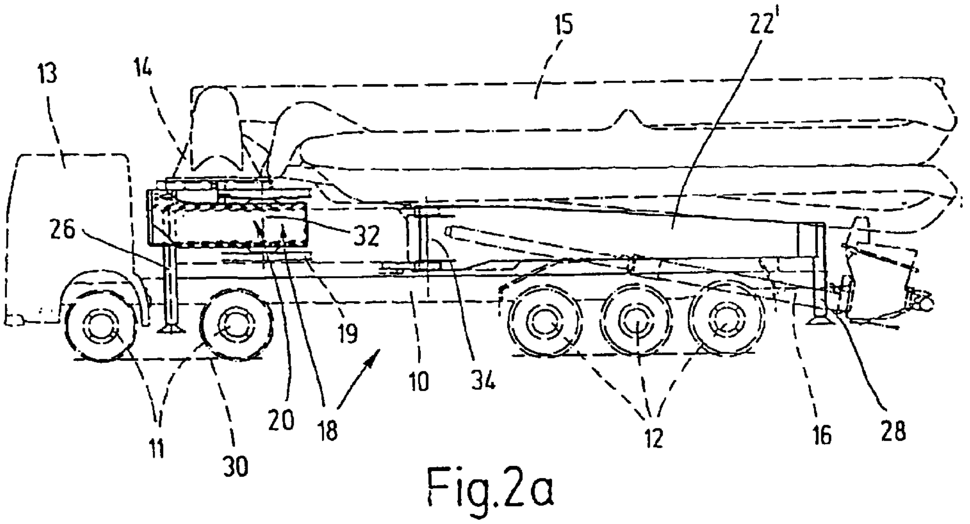
FIG. 2*a* a side view of a mobile concrete pump with forward support struts according to FIG. 1*b* in the transport position.
Figure 2B:
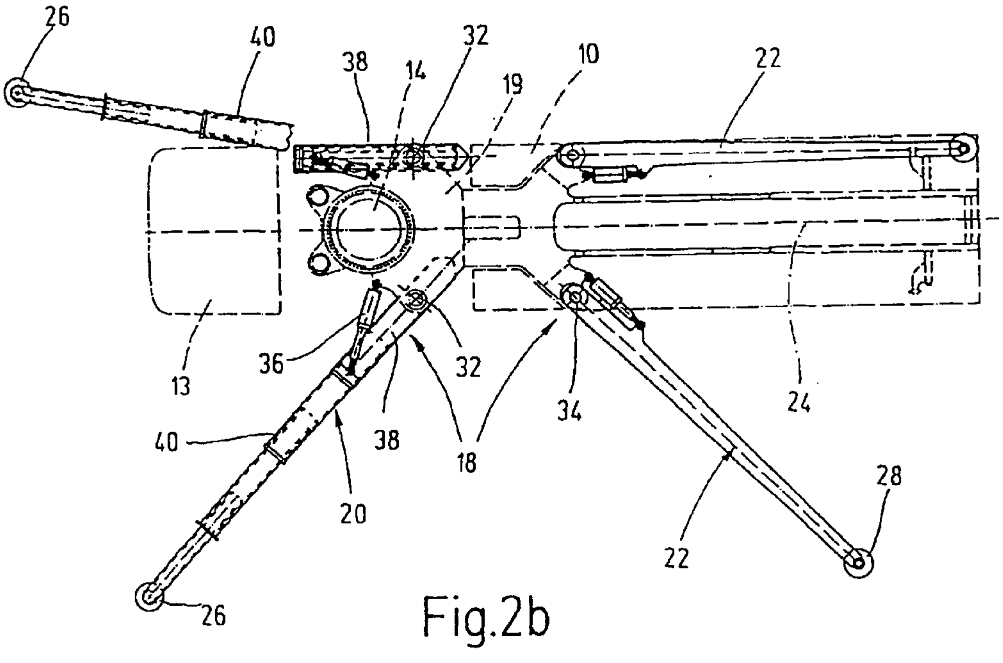
FIG. 2*b* a top view upon the mobile concrete pump with support struts in various positions.
Figure 3A:
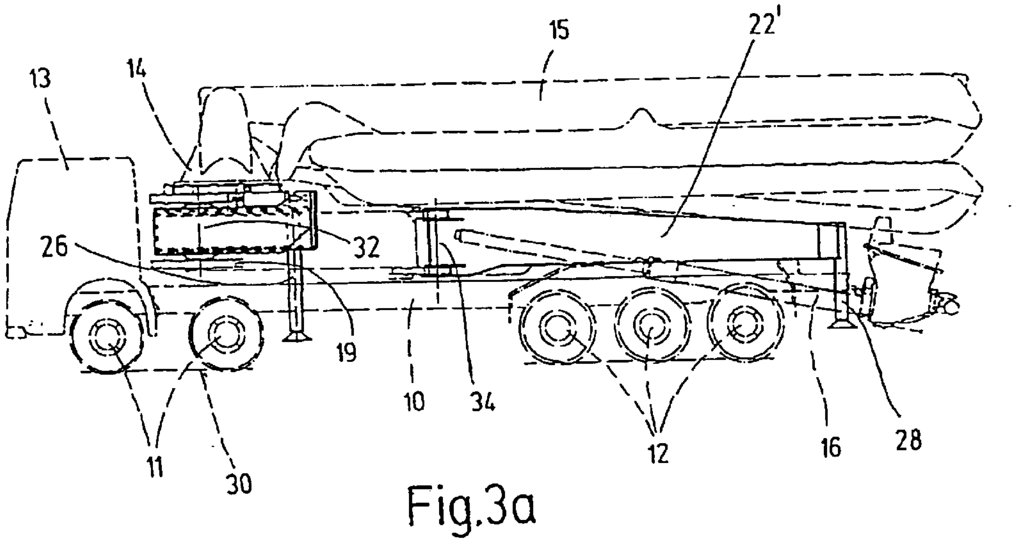
FIGS. 3*a* and *b* a second illustrative embodiment of a mobile concrete pump with forward and rearward support struts according to FIGS. 1*a* and *b* in representations according to FIGS. 2*a* and *b;*
Figure 3B:
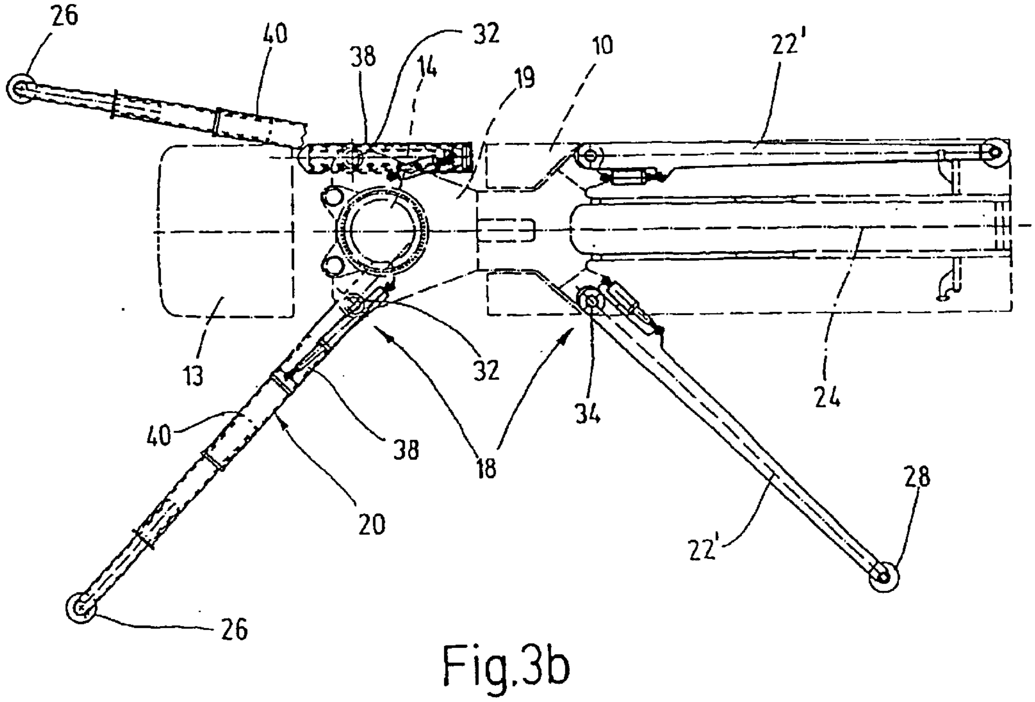

In the illustrated embodiments according to FIGS. 2*a* and *b* and 3*a* and *b* only the forward support struts 20 of the telescopic support struts are shown in the sense of the present embodiments. The rearward support struts are in the form of simple pivot struts. While on the one hand in the case of FIGS. 2*a* and *b* the forward support struts 20 are oriented with their foot parts 26 facing forwards in the transport direction, these are oriented in the case of FIGS. 3*a* and *b* with their foot parts 26 facing rearwards in the transport position. In the latter case the pivot axis 32 can be moved, in comparison to FIGS. 2*a* and *b*, further in the direction of the driver cabin 31, with advantages for the support strut width, for which however a somewhat larger space requirement is necessary during pivoting out and back.

Figure 4A:
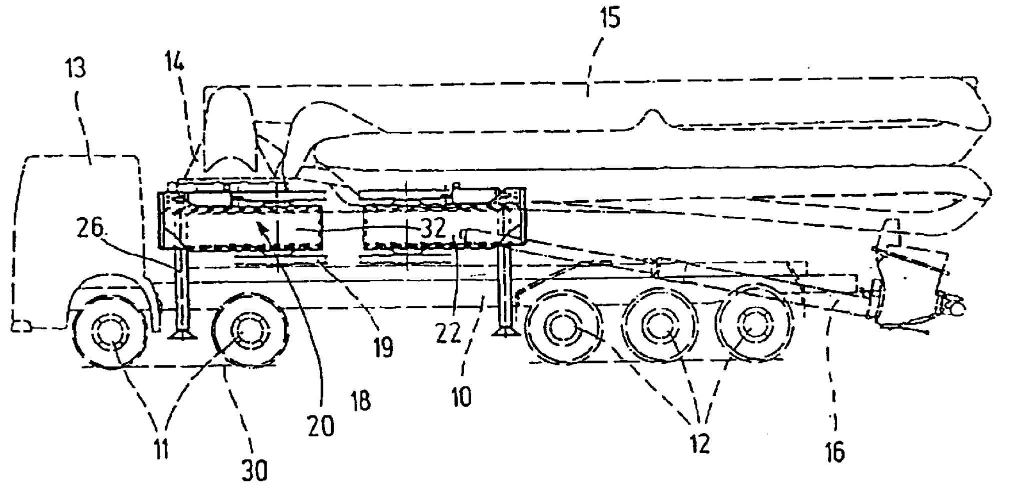
FIGS. 4*a* and *b* a third illustrative embodiment of a mobile concrete pump in representation according to FIGS. 3*a* and *b;*
Figure 4B:
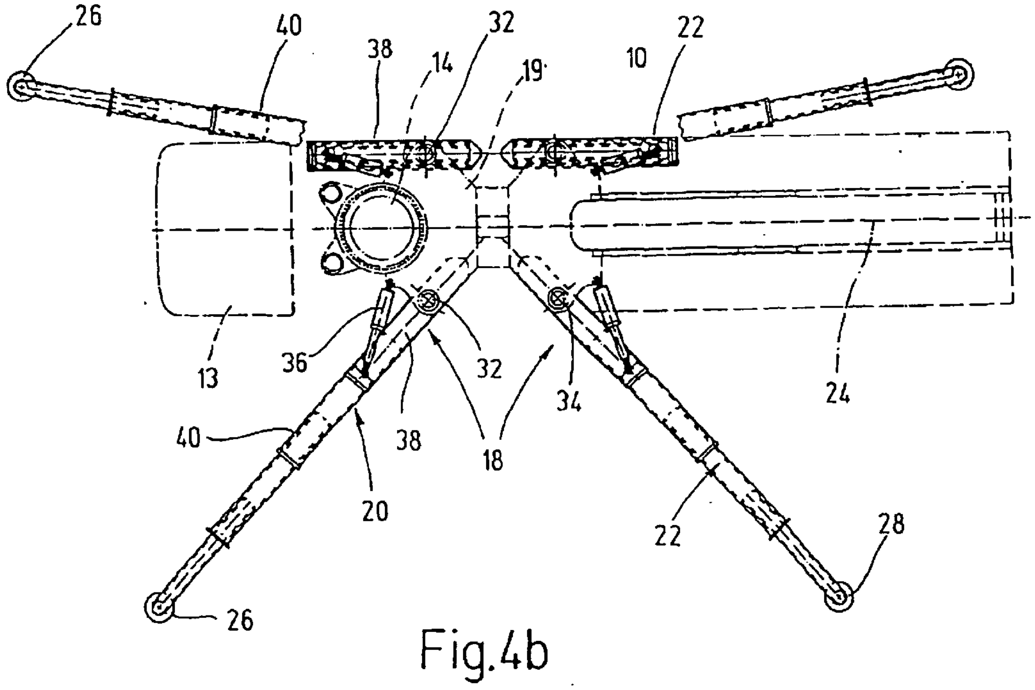
Figure 5A:
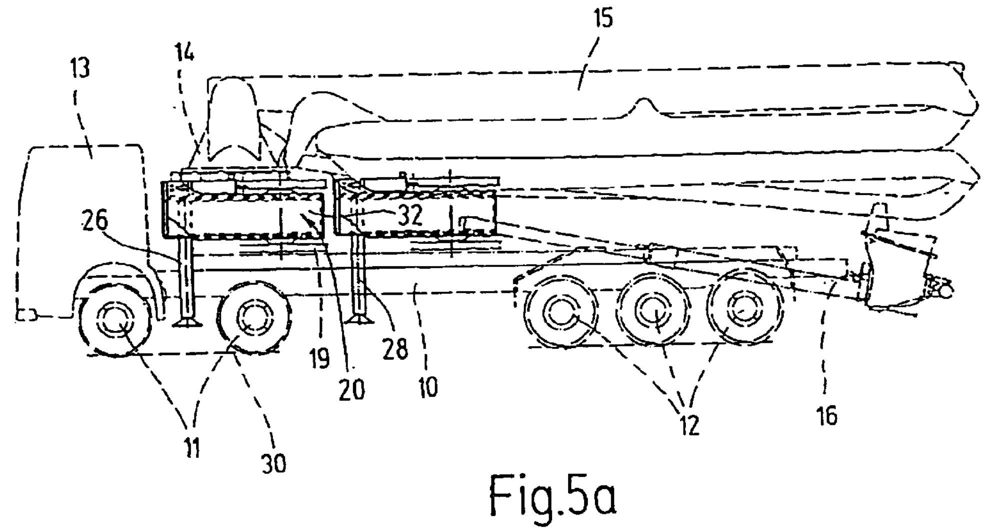
FIGS. 5*a* and *b* a fourth illustrative embodiment of a mobile concrete pump in representation according to FIGS. 3*a* and 3.
Figure 5B:
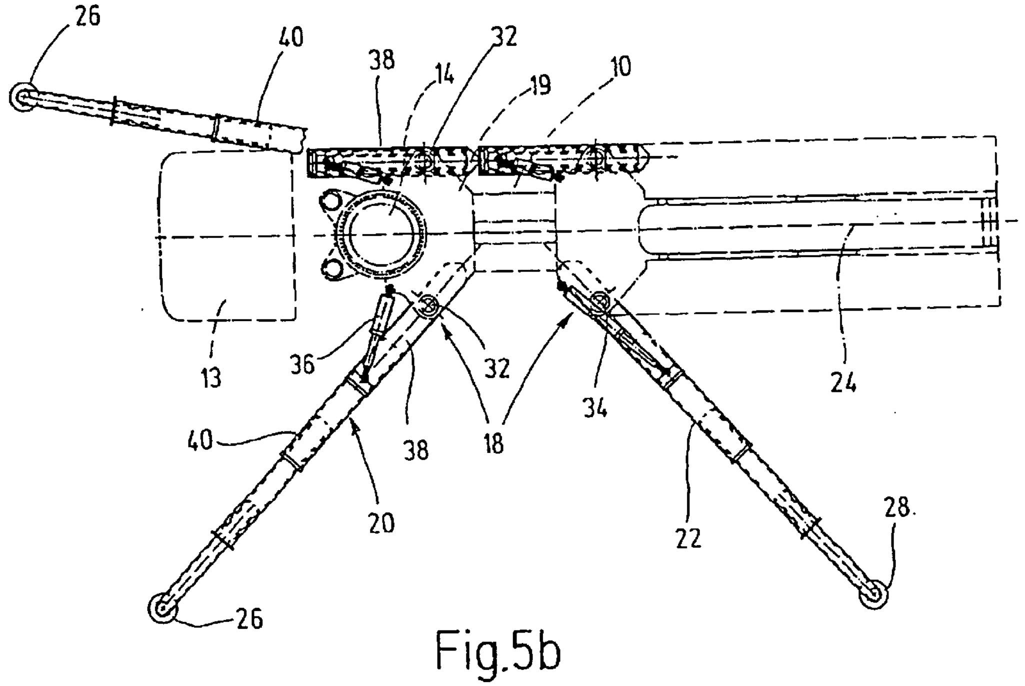

In the illustrated embodiment according to FIGS. 4*a* and *b* and 5*a* and *b* both the forward as well as the rearward support struts 20, 22 are in the form of telescopic support struts. The only difference in this illustrative embodiment is comprised therein, that the rearward support struts in the transport position in the case of FIGS. 4*a* and *b* face rearwards and in the case of FIGS. 5*a* and *b* face forwards. The advantages and disadvantages of these two designs is again to be seen therein, that the rearward facing support strut has a design which is somewhat space-saving, however this must be obtained at the cost of larger pivot area during the deployment process.

Figure 6A:
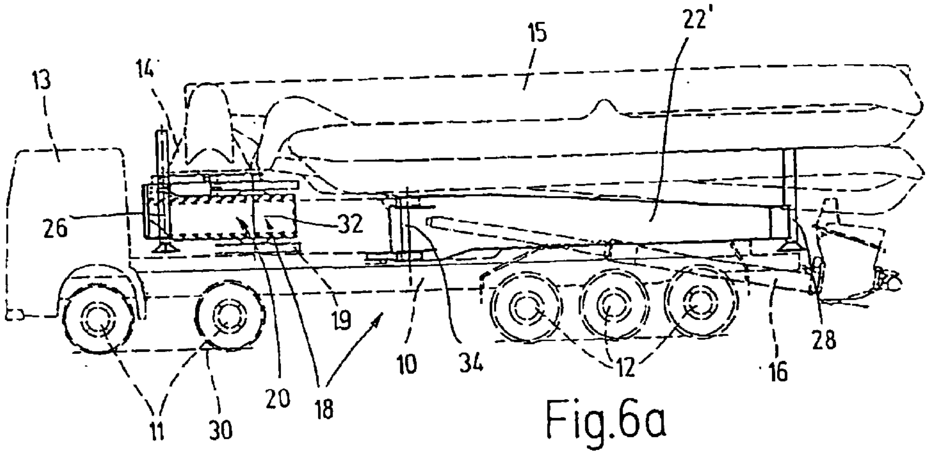
FIGS. 6*a* through *c* three further illustrative embodiments of a mobile concrete pump in representation according to FIGS. 2*a*, 3*a* and 4*a*.
Figure 6B:
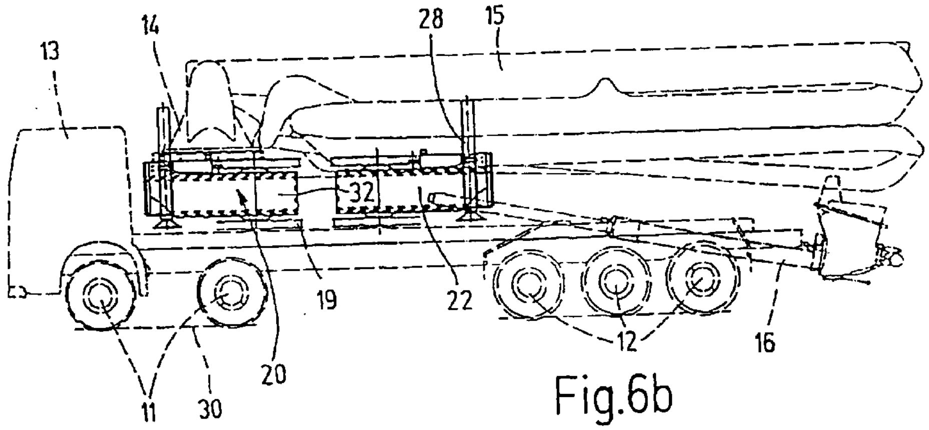
Figure 6C:
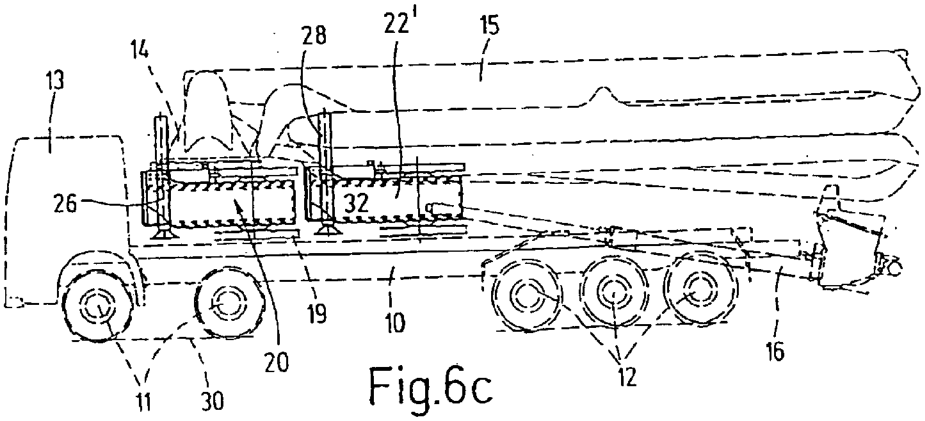

In the case of embodiments shown in FIGS. 6*a* through *c* the foot parts 26, 28 can be completely retracted in the transport condition, with the advantage of a greater floor freedom of the mobile concrete pump.

In summary the following can be concluded: The invention concerns a support boom for mobile working machines, especially for mobile concrete pumps. The support strut (20) has a strut body (38) that can be pivoted around a vertical pivoting axis (32) on a chassis (10), a telescopic part (40) that can be telescopically displaced relative to the body of the strut, a dual-acting hydraulic cylinder (42) that passes through the body of the strut (38) and the telescopic part (40), in addition to a foot part (26) that can be displaced vertically and is arranged on the outboard end of the telescopic part (40). Both ends of the telescopic hydraulic cylinder (42) are fixed on fixing points (46, 50) in the area of the opposite ends of the body of the strut (39/8) and the telescopic part (40). In order to reduce the required space in the transport position and during deployment of the support boom while ensuring stable support, the vertical pivoting axis (32) is defined by a divided bearing or journal location arranged at an axial distance (S) from the inboard fixing point (46) in the direction of the foot part on the body of the boom (38), said location being positioned in such a way that it transects the displacement axis (52) of the hydraulic cylinder (42) transversely.

What is a claimed:

1. A support strut for a mobile working machine, with a strut body (38) pivotable on a vehicle chassis (10) about a vertical pivot axis (32), with a telescopic part (40) telescopically displaceable relative to the strut body (38) and with a foot part (26) provided at the outboard end of the telescopic part (40), wherein a double-acting hydraulic cylinder (42) extends through the strut body and the telescopic part, the cylinder (42) connected at its respective ends to securing points (46, 50) in the area of opposing ends of the strut body (38) and the telescopic part (40), and wherein the vertical pivot axis (32) is defined by divided bearings (54) located on the strut body (38) spaced axially a distance (S) from the cylinder inboard securing point (46) in the direction of the foot part (26), and so positioned, that said vertical pivot axis transects the axis of displacement (52) of the hydraulic cylinder (42).

2. A support strut according to claim 1, wherein the bearings (54) are formed by two bearing journals or bearing pins (56) diametrically opposing each other on the bearing box.

3. A support strut according to claim 1, wherein the telescopic part (40) includes at least two telescopic tubes (40', 40", 40'") guided within each other.

4. A support strut according to claim 1 wherein the distance (S) of the pivot axis (32) from the inboard end of the strut body (38) is at least one-fifth and at the most two-thirds of the length of the strut body length.

5. A support strut according to claim 1 wherein the strut body (38) includes a roller surface or glide surface (62) in the vicinity of its outboard end, upon which the telescopic part (40) is supported during deployment and retraction.

6. A support strut according to claim 1 wherein the hydraulic cylinder (42) receives hydraulic input on the base or rod side from the inboard end of the strut body (38).

7. A support strut according to claim 1 wherein the hydraulic cylinder (42) is a telescopic cylinder connected with its outer-most rod end (44) with the strut body (38) and with its outer-most base end (48 ) with the most internal telescopic tube (40'").

8. A support strut according to claim 1 wherein the foot part (28) includes a hydraulic deployment cylinder, adapted to being acted upon via hydraulic fluid from a supply hose (58) adapted to be rolled upon a hose roll (60).

9. A support strut according to claim 1, wherein said foot part (26) is extendible.

10. A support strut according to claim 4, wherein the distance (S) of the pivot axis (32) from the inboard end of the strut body is between one quarter and one-third of the length of the strut body.

11. A mobile concrete pump with a vehicle chassis (10) provided with at least one forward axle (11) and one rearward axle (12), with a rotation mechanism (14) for a distribution mast (15) provided on the vehicle chassis (10) near the forward axle, with a pump unit (16) mounted on the vehicle chassis (10) behind the rotation mechanism (14) and with a support assembly (18) mounted on the vehicle chassis (10), which support assembly includes two forward support struts (20) pivotable about a vertical pivot axis (32) between a transport position and at least one support position and two rearward support struts (22, 22'), wherein the support struts (20) are mounted via divided or separated bearing bolts (56), which bearing bolts (56) are spaced axially and define the vertical pivot axis (32), with their strut bodies (38) in the vicinity of the rotation mechanism (14) on respectively one vehicle chassis-fixed bearing point (58), wherein the strut bodies (38) project with their two ends perpendicularly to the pivot axis (32) beyond the bearing point (54).

12. A mobile concrete pump according to claim 11, wherein the forward support struts (20) when in the transport position with retracted telescopic parts are oriented with their strut bodies (38) parallel to the vehicle chassis longitudinal axis (24) and when in the support position, with extended telescopic parts (40), project with their foot parts (26) diagonally forwards beyond the side edge of the vehicle chassis.

13. A mobile concrete pump according to claim 11 wherein the rearward support struts (22) are formed according to one of claims 1 through 9, are mounted respectively in a vehicle chassis fixed bearing point with their strut bodies (38) via divided bearing bolts (56), wherein the two ends of the strut bodies (38) project perpendicular to the pivot axis (34) beyond the bearing point.

14. A mobile concrete pump according to claim 11 wherein the axis of displacement (52) of the hydraulic cylinder (42) defines with the associated pivot axis (32, 34) of the forward and/or rearward support strut (20, 22) a slant angle decreasing from the bearing point (54) towards the foot part (26, 28).

15. A mobile concrete pump according to claim 11 wherein the foot part (26, 28) on the support strut (20, 22) is extended downwardly when in the support position and in the transport position is retracted to project upwards over the telescopic part (40).

16. A mobile concrete pump according to claim 12, wherein the forward support struts (20) in the transport position are oriented with their foot parts (26) facing forwards in the direction of travel.

17. A mobile concrete pump according to claim 12, wherein the forward support struts (20) in the transport position are oriented with their foot parts (26) facing rearwards relative to the direction of travel.

18. A mobile concrete pump according to claim 13, wherein the rearward support struts (22), when in the transport position with retracted telescopic parts (40), are oriented with their strut bodies (38) parallel to the vehicle chassis longitudinal axis (24) and when in the support position with extended telescopic parts (40) project with their foot parts (28) diagonally downwards beyond the side edge of the vehicle chassis.

19. A mobile concrete pump according to claim 18, wherein the rearward support struts (22) in the transport position are oriented with their foot parts (28) facing forwards in the direction of travel.

20. A mobile concrete pump according to claim 18, wherein the rearward support struts (22) in the transport position are oriented with their foot parts (28) facing rearwards relative to the direction of travel.

* * * * *